United States Patent [19]

Johnsen, Jr. et al.

[11] Patent Number: 5,451,140

[45] Date of Patent: Sep. 19, 1995

[54] FUGITIVE VOLATILE ORGANIC COMPOUND VAPOR COLLECTION SYSTEM

[75] Inventors: Cortland Johnsen, Jr., Benicia; John S. Angen, Fairfield; Douglas R. McCay, Rodeo; Timothy J. Sutherland, Hercules; Arthur D. Mares, Vallejo; John F. Lizarraga, Rodeo; Tonny W. Eilertson, Vallejo; Steve A. Nicholas, San Leandro, all of Calif.

[73] Assignee: Chevron U.S.A. Inc., San Francisco, Calif.

[21] Appl. No.: 275,695

[22] Filed: Jul. 15, 1994

Related U.S. Application Data

[63] Continuation-in-part of Ser. No. 55,604, Apr. 30, 1993, Pat. No. 5,344,313.

[51] Int. Cl.⁶ .............................................. F01D 25/32
[52] U.S. Cl. .................... 415/168.2; 431/346
[58] Field of Search ................. 415/168.2; 431/346

[56] References Cited

U.S. PATENT DOCUMENTS

| | | | |
|---|---|---|---|
| 2,802,521 | 8/1957 | Campell et al. | 431/346 |
| 3,357,472 | 12/1967 | Rhodes et al. | 431/346 |
| 3,999,936 | 12/1976 | Hesselmann | 431/346 |
| 4,058,147 | 11/1977 | Stary et al. | 141/45 |
| 4,678,120 | 7/1987 | Matsuo | 431/346 |
| 4,722,662 | 2/1988 | Morgan | 415/168.2 |
| 4,869,229 | 9/1989 | Johnson | 431/346 |
| 5,050,603 | 9/1991 | Stokes et al. | 123/760 |
| 5,344,313 | 9/1994 | Johnsen, Jr. | 431/346 |

FOREIGN PATENT DOCUMENTS

208196 1/1987 European Pat. Off. ............ 431/346

*Primary Examiner*—John T. Kwon
*Attorney, Agent, or Firm*—V. J. Cavalieri; A. W. Klaassen

[57] ABSTRACT

A process is provided for controlling volatile organic compound emissions from rotating and reciprocating mechanical equipment. The process comprises a vapor flow, a combustion, and a flow control for preventing combustion of the volatile organic compound within the system.

11 Claims, 3 Drawing Sheets

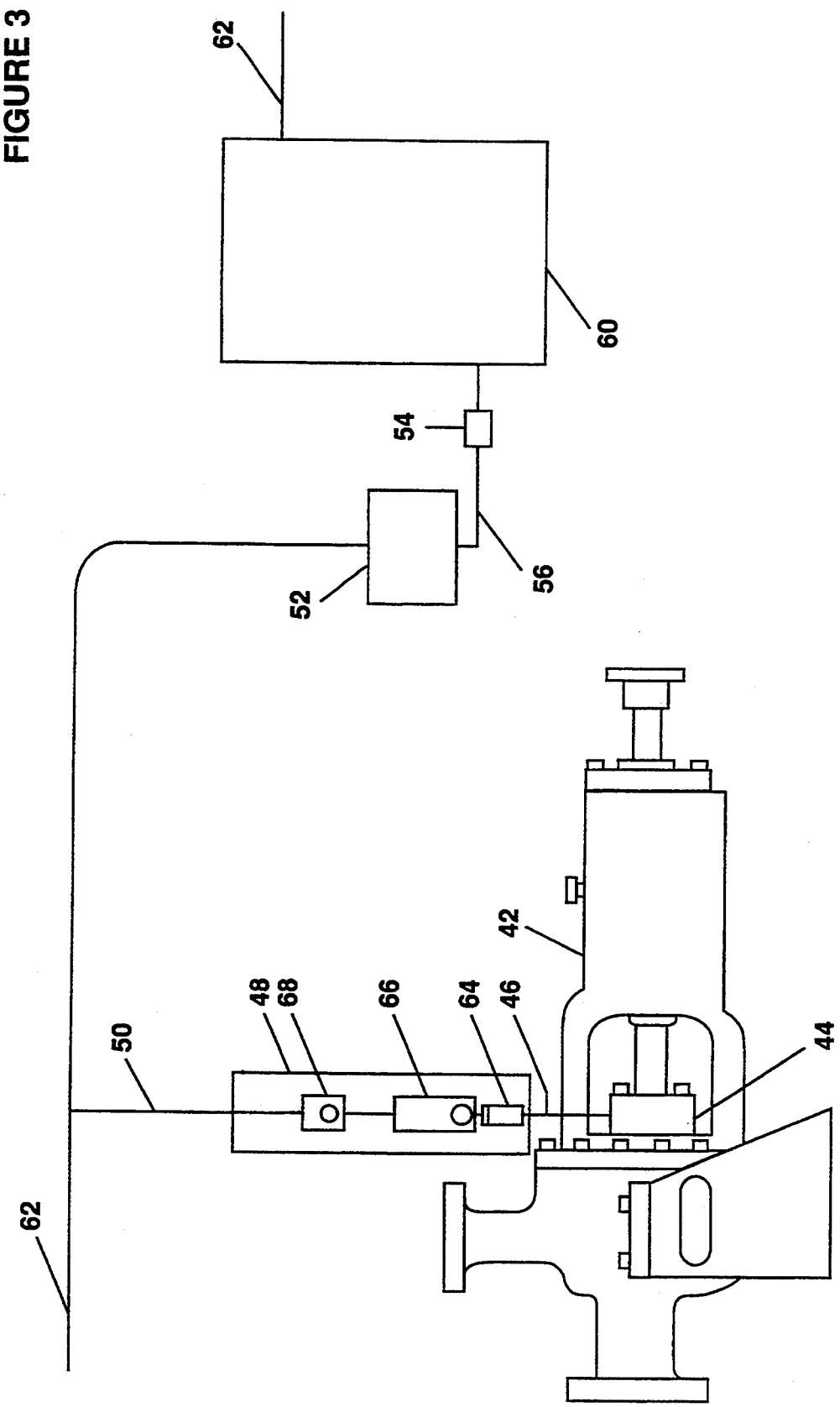

FUGITIVE VOLATILE ORGANIC COMPOUND VAPOR COLLECTION SYSTEM

This is continuation-in-part application of U.S. Ser. No. 08/055,604, filed Apr. 30, 1993, now U.S. Pat. No. 5,344,313.

BACKGROUND OF THE INVENTION

This invention relates to a process and apparatus for the collection of volatile vapors in and around mechanical equipment for disposal in a safe manner. More particularly, the preferred embodiment is directed to a process and collection system for withdrawing and disposing of volatile organic vapors from rotating or reciprocating equipment, and more specifically from one or more pumps handling volatile organic compounds at one or multiple locations. Volatile organic compounds, or "VOC", are known to be precursors to the formation of ozone in the atmosphere. Among the many types of compressors and mechanical equipment used in processing and handling vapors and liquids in the hydrocarbon processing industries, the centrifugal and reciprocating pumps have been identified as one source of VOC emissions. Means for sealing the rotating shaft in a centrifugal pump housing have been the subject of much attention in pursuit of a solution to the VOC emission problem. A vapor emission control system for centrifugal pumps is disclosed in U.S. Pat. No. 4,722,662, issued Feb. 2, 1988 to Morgan. U.S. Pat. No. 4,722,662 describes a centrifugal pump removable cover disposed between the seal housing portions of the pump casing and the outboard bearing housing portions of the pump, which cover has vapor absorption filters supported thereon and in fluid flow communication with the pump fluid leakage collection spaces formed between the pump shaft seal housing and the pump shaft bearing housing.

Another approach to handling VOC emissions from centrifugal pumps involves the use of a fluidic seal displaced between the shaft seals of a centrifugal pump. Fluidic means for sealing pumps are costly and still do not provide a leakage level low enough for compliance with proposed government emission limits.

A number of vapor recovery systems for the pumping of volatile organic compounds have also been taught. A vapor recovery system disclosed in U.S. Pat. No. 4,058,147 issued Nov. 15, 1977 to Stary et al teaches a recovery system for withdrawing flammable vapors from the vicinity of a dispensing nozzle at a service station or the like, and disposing of the vapors in a combustor.

A mobile emission recovery apparatus disclosed in U.S. Pat. No. 5,050,603, issued Sep. 24, 1991 to Stokes et al teaches an inline blower for maintaining flow of VOC emissions through the apparatus, and an internal combustion engine adapted to use light hydrocarbon as fuel. It is important in the teaching of Stokes that the feed to the engine not exceed the lower explosion limit of the vapor.

BRIEF DESCRIPTION OF THE DRAWINGS

FIG. 3 depicts the field installation of preferred embodiments for venting and disposing VOC vapors in a combustor from at least one centrifugal pump.

SUMMARY OF THE INVENTION

Figure 1:
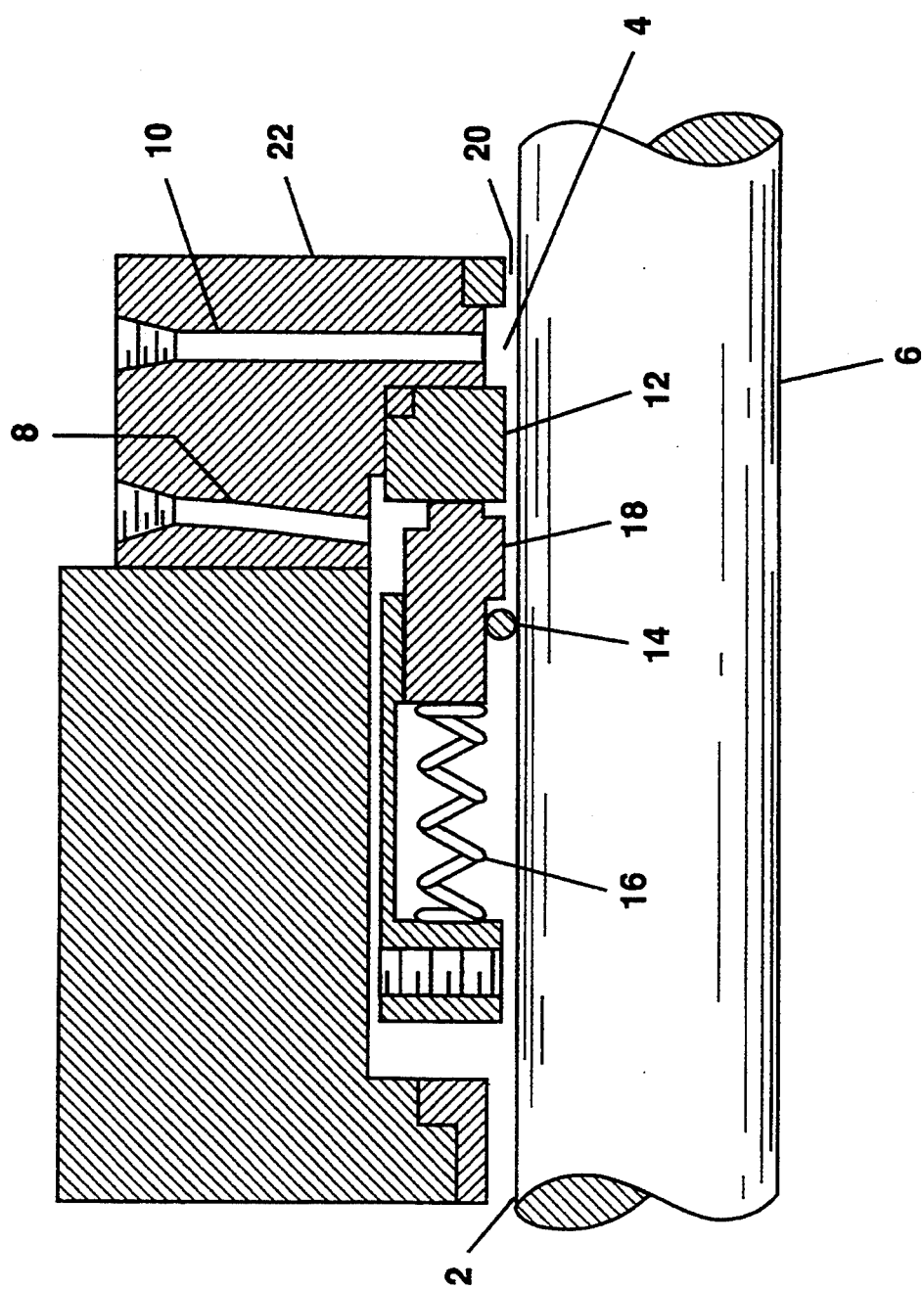
FIG. 1 depicts the seal area around the shaft of a representative centrifugal pump and vent ports disposed therein.

In accordance with my invention, a method is provided for controlling volatile organic compound emissions from rotating and reciprocating mechanical equipment. Also provided is a system for collecting and disposing such emissions while minimizing or preventing the chances of explosion or combustion within the collection system.

More preferably, my invention provides a collection system and a process for controlling fugitive organic compound vapor emissions from a pump handling volatile organic compounds comprising:

a. a vapor flow means for drawing sufficient air into a seal region of a pump and for withdrawing an air-/organic compound vapor mixture from said seal region;

b. a combustion means in fluid communication with said vapor flow means for disposal of said air/organic compound vapor mixture; and c. flow control means in fluid communication with said seal region and with said vapor flow means for preventing combustion of said mixture in said system.

Among other factors, I have found that, by withdrawing organic vapors from a pump seal region at low pressure, and by providing control units for controlling the flow of vapors to a combustor, it is possible to greatly reduce or eliminate fugitive VOC emissions from process pumps used for moving volatile organic compounds while maintaining a low risk of fire or explosion.

Surprisingly, in a commercial hydrocarbon processing operation having one or multiple centrifugal or reciprocating pumps handling flammable organic liquid, such pumps may be maintained on a single disposal collection end emission handling system, at a significantly reduced cost over prior art emission control means.

DETAILED DESCRIPTION OF THE INVENTION

Principal Features

Those familiar with the art related to the present invention will appreciate the full scope of the process summarized above and be able to practice the process over its full scope from a detailed description of the principal features of the process and the example which follows.

The collection system of the present invention is characterized by three principal features: (1) means for reducing to very low levels and in many cases eliminating the VOC emissions from pumps used for pumping volatile organic compounds; (2) means for preventing the combustion of the VOC emissions within the collection system and outside a combustor provided for that purpose; and (3) means for preventing the flow of liquid from the pump through the collection system.

Reducing the VOC emissions to very low levels requires withdrawing the vapors directly at the source of the emissions. In the case of emissions from pumps, an important VOC emission source is at the interface between the seal region of the pump and the reciprocating or rotating pump shaft. In the present system, a conduit is provided having one end at or near this seal region/shaft interface, and at the other end a means for withdrawing the vapors from the seal region. Although not required by the invention, there is frequently provided on the pump a port opening into the seal region, such as a quench port, which may be used for withdrawing the organic vapors.

In the absence of a system for withdrawing the fugitive vapors from the seal region, the vapors will pass through an annular region around the pump shaft and between the shaft and the pump housing, and from there will be emitted into the atmosphere. Normally, the VOC concentration is measured external to the pump and near, typically about 1 cm from, this annular region. Measurement devices for VOC emissions are readily available. Pumps having measurable VOC emissions of 100,000 ppm and greater may be controlled using the present system. In general, for pumps having organic vapor emissions withdrawn using the present system, the VOC concentration will be less than about 100 ppm, preferably less than about 50 ppm, and more preferably less than about 20 ppm at a point 1 cm from the annular region.

As vapors are withdrawn from the seal region, air is drawn through the annular region to replace the withdrawn vapors, to ensure that no vapors escape into the atmosphere, and to dilute the vapors to a concentration below the lower explosion limit (LEL) for that material. For reasons of safety, it is preferred that the collection system be operated either below the LEL or above the upper explosion limit (UEL). When the organic vapor concentration in the air/organic vapor mixture is between the LEL and the UEL, an ignition source will initiate combustion of the mixture, with potentially catastrophic consequences. However, it is an important feature of the present invention that the air/organic vapor mixture may be safely handled and disposed under conditions in which the organic vapor concentration is in the region between the LEL and the UEL.

As stated above, ambient air is mixed with the organic vapors being withdrawn from the seal region of the pump. For reasons of cost, air is the preferred diluent. However, any gas which is not detrimental to the vapor withdrawal, including an inert gas such as nitrogen, may be fed into the seal region to dilute the organic vapor.

The present system provides for a vapor flow means for drawing sufficient air into the seal region of a pump and for withdrawing an air/organic vapor mixture from the seal region. The withdrawal process is a low pressure process. To facilitate movement of air into the seal region of the pump, the pressure in the seal region is preferably subatmospheric. Alternatively, a positive pressure of gas injected into the seal region may be exploited, but the pressure will generally be only sufficient to maintain a flow into and out of the collection system. A total flow rate of the air/organic compound vapor mixture from the pump of between about 0.1 and about 15 ft$^3$/hr, preferably between about 1 and about 5 ft$^3$/hr, and more preferably between about 1 and about 3 ft$^3$/hr, is sufficient to reduce the fugitive organic vapor emissions from a pump to an acceptably low level, and often below the detection limit of VOC analyzers which are currently available. Vapor flow means for maintaining this flow rate will depend somewhat on the number of pumps and collection systems which are being served by one flow means. Selection and sizing of the flow means involves general engineering expertise. However, in most installations, a fan or vacuum pump which maintains a slight vacuum on the seal region of the pump is preferred.

A second critical aspect of the present collection system is a means for preventing the combustion of the VOC emissions within the collection system and outside a combustor provided for that purpose. A third critical aspect is a means for preventing the flow of liquid from the pump through the collection system. These features are provided by the flow control means.

Under normal conditions, withdrawal rates of the air/organic vapor mixture from the seal region will be controlled to maintain the concentration of organic vapors lower than the LEL, and combustion will be suppressed. However, the system must also handle upsets which may increase the concentration of organic vapors to above the LEL. The present collection system provides for a combustion means for disposing of the vapors. As the pump handling volatile organic liquids is in vapor communication with the combustion means, there always remains the possibility of a spark or ignition source in the collection system, with potentially catastrophic results. The fluid flow control means are included in the present system to prevent such an occurrence. For example, the fluid flow control means may comprise a means for arresting passage of a flame front into the collection system; a means for monitoring and controlling vapor flow; a means for preventing excessive flow of vapor into the collection system; or a means for preventing liquid flow into and through said collection system. Devices to perform these individual functions are readily available from commercial sources or can be made by simple modifications of commercially available devices. Other known control devices may also be added to maintain control of individual systems as specific needs arise.

DETAILED DESCRIPTION OF THE PREFERRED EMBODIMENTS

Referring now to FIG. 1, a detailed section in cutaway view is shown of the area of the seal region and rotating shaft 6, with impeller end 2, of a representative centrifugal pump to which the present invention is applicable. The seal type shown is a contact face mechanical seal. Centrifugal pumps are well known in the art, and are described, for example, in Chemical Engineers' Handbook, 5th Ed., 1973, p. 6-5.

In FIG. 1, seal member O-ring 14 is maintained in continuous contact between pump shaft 6 and rotating seal member face 18, alternatively known as a seal ring. Rotating seal ring 18 is held firmly against stationary seal member 12 by spring 16. The stationary seal member 12 is typically in close proximity, but not intimately contacting shaft 6. Likewise, the seal end plate 22 does not typically contact shaft 6, so that annular region 20 allows for fluid flow into and out of seal cavity region 4. Ideally, O-ring 14 will limit leakage between shaft 6 and rotating seal face 18. Normally, however, a small amount of liquid is present between the two seal faces 12 and 18 to provide lubrication to the faces. The liquid passing through the two faces and into the seal cavity region 4 is the primary source of emissions from the seal. Thus, virtually all pump seals leak to some extent. Uncollected vapor from the leaked organic compounds pass through annular region 20 and into the atmosphere.

The seal region of the pusher type seal to which my invention is applicable is generally provided with one or more ports providing fluid communication through the seal end plate 22. In one embodiment of my present invention, quench port 10 is positioned outboard of flush port 8 and is utilized in the practice of my invention to evacuate seal cavity region 4 outboard of the rotating member 18 to minimize the escape of vapors to the atmosphere through annular region 20.

Figure 2:
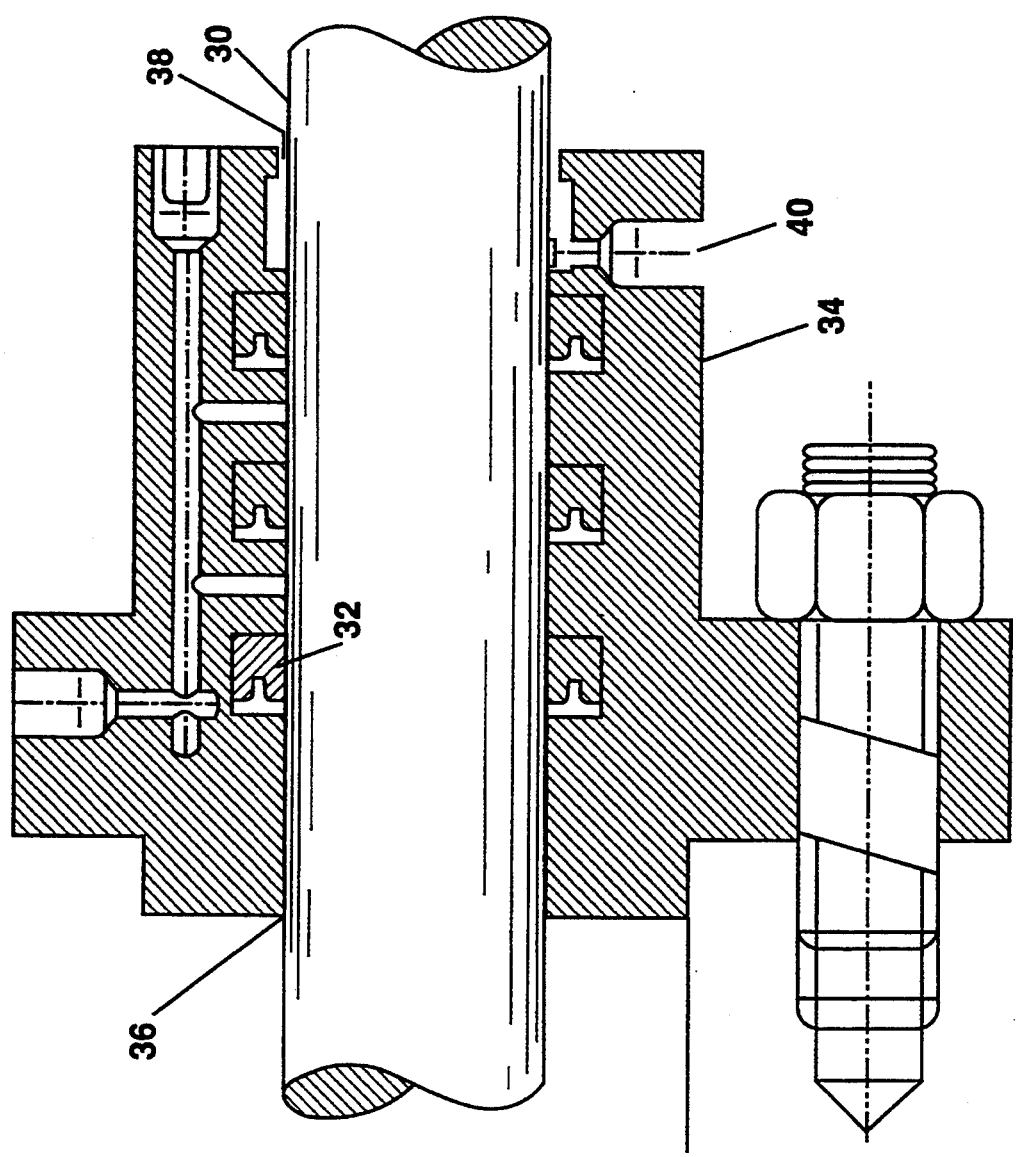
FIG. 2 depicts the seal area around the shaft of a representative reciprocating pump and vent ports disposed therein.

Referring now to FIG. 2, a detailed section in cutaway view is shown of the seal region of a reciprocating pump piston rod. Piston rod 30 is maintained in intimate contact with elastomer U-cup or other packing 32 inside packing gland housing 34. Fugitive organic volatile liquids and vapors which escape through packing 32 from the high pressure side 36 of the pump to annular space 38 are withdrawn through vacuum recovery vent Referring now to FIG. 3, a schematic view is depicted of the system for controlling volatile organic compound emissions from a pump 42 having a seal region 44. Note that pump 42 as shown is a centrifugal pump, though pumps of other types, such as a reciprocating pump, may be used. It should be recognized that, while only a single seal region is shown, a pump may include a multiplicity of seal regions, each of which may be connected to at least one of the present collection systems.

The apparatus for controlling fugitive organic compound vapor emissions from a pump comprises a means for drawing air into the seal region of a pump and for withdrawing an air/organic compound vapor mixture from the seal region, a means for disposing of the air/organic compound vapor mixture, and a control means for maintaining vapor flow and for preventing combustion of the air/organic compound vapor mixture inside the collection system.

In FIG. 3, seal region 44 of pump 42 is connected through line 46 to control means 48. The control means has a number of important functions, including preventing flow of liquid from line 46 to line 50, controlling and/or limiting the flow of vapor from line 46 to line 50, maintaining the pressure in lines 46 and 50 below a critical pressure, preventing the movement of an ignition flame front through the control means, and preventing any fluid flow from line 50 to line 46. Devices for providing these individual functions are available to the practitioner.

Control means 48 in the preferred embodiment depicted in FIG. 3 may include, for example, a flame arrester/thermal fuse 64, a micrometer controlled purge flow meter 66, and a double seated vapor release ball check valve 68. The order in which the components of the control means are positioned between line 46 and line 50 are not significant, though it is preferred for safety considerations that the flame arrester/thermal fuse be located nearest pump 42.

The flame arrestor equipped with thermal fuse prevents the movement of a flame front from the pump into the collection system. The double-seated vapor release ball check valve prevents back flow of fluid from the combustion means to the pump. The check valve may be modified by replacing the ball with a hollow ball and removing the top spring. This modification improves the capability of stopping flow into the collection system in the event liquid flows into the check valve, and preventing excess fluid flow into the collection system. The micrometer controlled purge flow meter maintains a steady fluid flow rate through the collection system.

The vapor control means 52 is a mechanical or static device for moving fluids, and primarily vapors, at relatively low pressures. Indeed, it is preferred that the pressure in line 50 be maintained at below atmospheric pressure during operation of the present apparatus to maintain vapor flow. Thus, vapor flow means 52 may be a fan, a vacuum pump, or an eductor. These vapor flow devices are well known in the art and do not require further description here. The critical aspect of the vapor flow means is the rate of vapor flow through the apparatus. I have found that an air/organic compound vapor rate out of a pump into the present collection system of between 0.1 and about 15 ft$^3$/hr, preferably between about 1 and about 5 ft$^3$/hr, and more preferably between about 1 and about 3 ft$^3$/hr, is sufficient to reduce the fugitive organic vapor emissions from the pump to an acceptably low level. In most cases, a vapor flow rate as described above is sufficient to reduce the VOC concentration at a point 1 cm from and external to the annular region 20 in FIG. 1 to less than about 100 ppm, preferably to less than about 50 ppm, and more preferably to less than about 20 ppm.

Although a single pump and control means is shown in FIG. 3, a multiplicity of pumps may be served by the collection system along line 62, each pump, or each seal region of each pump, having a separate flow control means.

A second flame arrestor 54 in FIG. 3 is positioned in line 56 to prevent an ignition flame front from moving from disposal means 58 into line 56. Flame arresters are readily available, and those skilled in the art can easily size an arrestor for each situation to handle the vapor flow rates required for that situation.

The air/organic compound vapor mixture is disposed in combustor 60. When a process furnace or boiler is available, it may be preferred to direct the vapor into the combustion chamber of the furnace. In general, the quantity of vapor going to the furnace from the present fugitive emission control apparatus is negligible relative to the total mass traffic through the furnace, and special structural or operational modifications of the furnace are not required.

Alternatively, the combustion means may be an oxidizer having as a primary purpose the disposal of the air/organic compound vapor mixture collected as fugitive emissions from one or more pumps. Oxidizers of this type may be fired primarily by the air/organic compound vapor mixture, with auxiliary fuel added as needed. Alternatively the oxidizer may be electrically heated and/or may contain oxidation catalyst to augment oxidation of the mixture. An example of an oxidizer of this type is described, for example, in U.S. Pat. No. 4,983,364.

In a separate embodiment of this invention, the vapor flow means may be located in the vapor flow stream downstream of the combustor in line 62. This embodiment may be preferred when the combustor is an oxidizer as described above.

The apparatus of this invention, as described herein, may also contain various filters, valves, heat exchangers, and the like, which would be obvious to one skilled in the art. The scope of the invention should, therefore, not be determined nor limited by reference to the above description, but instead should be determined with reference to the appended claims along with their full scope of equivalents.

What is claimed is:

1. A process for controlling fugitive organic compound vapor emissions from a pump using a collection system comprising:

a. vapor flow means for drawing sufficient air into a seal region of said pump and for withdrawing an air/organic compound vapor mixture from said seal region;

b. a combustion means in fluid communication with said vapor flow means for disposal of said air/organic compound vapor mixture; and a. flow control means in fluid communication with said seal region and with said vapor flow means for preventing combustion of said mixture in said system.

2. The process of claim 1 wherein the rate of the air/organic vapor compound mixture into said collection system from said pump is between about 0.1 and about 15 ft$^3$/hr.

3. The process of claim 2 wherein the rate of the air/organic vapor compound mixture into said collection system from said pump is between about 1 and about 5 ft$^3$/hr.

4. The process of claim 3 wherein air is drawn into said seal region at a volumetric flow rate of between about 1 and about 3 ft$^3$/hr.

5. The process of claim 1 wherein the concentration of fugitive organic compound vapor measured at a position external to said pump and 1 cm from said seal region is less than about 100 ppm.

6. The process of claim 5 wherein the concentration of fugitive organic compound vapor measured at a position external to said pump and 1 cm from said seal region is less than about 50 ppm.

7. The process of claim 1 wherein said vapor flow means is an eductor.

8. The process of claim 1 wherein said vapor flow means is a vacuum pump.

9. The process of claim 1 wherein the combustion means is a furnace.

10. The process of claim 1 wherein the combustion means is an oxidizer.

11. The process of claim 1 wherein the flow control means comprises:

a. means for arresting passage of a flame front;

b. means for monitoring and controlling vapor flow; and c. means for preventing liquid flow through said collection system.

* * * * *